(12) United States Patent
Roberts et al.

(10) Patent No.: US 9,411,214 B2
(45) Date of Patent: Aug. 9, 2016

(54) COUNTERBALANCED MONOPOD JIB FOR CAMERAS

(71) Applicant: Disney Enterprises, Inc., Burbank, CA (US)

(72) Inventors: Vincent H. Roberts, Thousand Oaks, CA (US); Kenneth D. Salter, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 13/843,878

(22) Filed: Mar. 15, 2013

(65) Prior Publication Data

US 2014/0211975 A1    Jul. 31, 2014

Related U.S. Application Data

(60) Provisional application No. 61/758,213, filed on Jan. 29, 2013.

(51) Int. Cl.
| | |
|---|---|
| *G03B 17/56* | (2006.01) |
| *F16M 11/04* | (2006.01) |
| *F16M 13/04* | (2006.01) |
| *F16M 11/14* | (2006.01) |
| *F16M 11/20* | (2006.01) |

(52) U.S. Cl.
CPC .............. *G03B 17/561* (2013.01); *F16M 11/04* (2013.01); *F16M 11/14* (2013.01); *F16M 11/2078* (2013.01); *F16M 13/04* (2013.01); *F16M 2200/041* (2013.01)

(58) Field of Classification Search
CPC ................. F16M 13/00–13/027; F16M 11/00; F16M 11/04; F16M 11/06; F16M 11/08; F16M 11/123; F16M 11/125; F16M 11/205; E04H 12/22; E04H 12/2253; E04H 12/2284; G03B 17/56; G03B 17/561; G03B 17/563; G03B 17/565; G03B 17/566; G03B 17/568; G03B 17/58; H04N 5/23248; B66F 11/048
USPC .................................................. 348/373–376
See application file for complete search history.

(56) References Cited

U.S. PATENT DOCUMENTS

| | | | | |
|---|---|---|---|---|
| 4,017,168 | A * | 4/1977 | Brown ................... | F16M 11/04 248/586 |
| 4,030,114 | A * | 6/1977 | Telfer ..................... | F16M 11/00 248/159 |
| 4,946,272 | A * | 8/1990 | Brown ................... | F16M 13/04 352/243 |
| 5,098,182 | A * | 3/1992 | Brown ................... | F16M 13/04 224/908 |
| 5,235,227 | A * | 8/1993 | Fazekas ................ | F16C 27/066 310/51 |
| 5,243,370 | A * | 9/1993 | Slater .................... | F16M 13/04 248/123.2 |
| 5,454,042 | A * | 9/1995 | Drever ................... | F16M 13/04 381/361 |
| 6,550,734 | B1 * | 4/2003 | Spadea .................. | F16M 11/04 248/274.1 |
| 7,090,416 | B2 * | 8/2006 | Mootz .................... | F16M 11/04 248/187.1 |
| 7,625,090 | B2 * | 12/2009 | Brown ................... | F16M 13/04 248/187.1 |

(Continued)

*Primary Examiner* — Pritham Prabhakher
(74) *Attorney, Agent, or Firm* — Ference & Associates LLC

(57) ABSTRACT

One embodiment provides a counterbalancing arrangement, including: a pin arrangement attached to a monopole; the pin arrangement rotating with respect to the monopole such that roll movement of the monopole imparts yaw movement to the pin arrangement; the pin arrangement having a gimbal; a camera mounting platform having an upper and lower surface; the gimbal connecting to the lower surface of the camera mounting platform; the gimbal having a yaw degree of freedom locked with respect to the camera mounting platform; and a counterbalancing arm attached to the camera mounting platform. Other aspects are described and claimed.

11 Claims, 9 Drawing Sheets

(56) References Cited

U.S. PATENT DOCUMENTS

| | | | | |
|---|---|---|---|---|
| 8,125,564 B2* | 2/2012 | Kozlov | | B66F 11/048 224/185 |
| 8,142,083 B2* | 3/2012 | Brown | | F16M 11/2035 352/243 |
| 8,534,934 B1* | 9/2013 | Carney | | F16M 11/02 248/178.1 |
| 2006/0262274 A1* | 11/2006 | Brown | | F16M 13/04 352/243 |
| 2007/0050139 A1* | 3/2007 | Sidman | | F16M 11/041 318/649 |
| 2008/0304687 A1* | 12/2008 | Howell | | H04R 1/08 381/362 |
| 2009/0257741 A1* | 10/2009 | Greb | | F16M 13/04 396/55 |
| 2011/0187875 A1* | 8/2011 | Sanchez | | A61B 19/2203 348/207.11 |
| 2012/0049035 A1* | 3/2012 | Black | | F16M 11/10 248/425 |
| 2012/0099851 A1* | 4/2012 | Brown | | F16M 13/04 396/421 |
| 2012/0200722 A1* | 8/2012 | Kozlov | | B66F 11/048 348/208.7 |

* cited by examiner

SECTION B-B

COUNTERBALANCED MONOPOD JIB FOR CAMERAS

This application claims the benefit of U.S. Provisional Application Ser. No. 61/758,213, entitled "COUNTERBALANCED MONOPOD JIB FOR CAMERAS", filed on Jan. 29, 2013, the contents of which are incorporated by reference in their entirety herein.

BACKGROUND

Counterbalancing arrangements for cameras attempt to provide stabilization to the camera during mobile use. For example, a conventional counterbalancing arrangement includes a camera mounting portion, e.g., a platform to which the camera attaches to, and a counterbalance, e.g., a counterbalancing arm. These components sit atop a gimbal such that the camera platform, camera, and counterbalancing arm are balanced in such a way that motion of the camera is dampened.

Counterbalancing arrangements for cameras, examples including the "FLOWPOD", produced by VariZoom, and the Mini Motion-Cam Stabilizer, produced by Hague, therefore conceptually provide stability to a camera mounted on the arrangement. Counterbalancing is useful or even necessary in certain circumstances, e.g., maintaining stability of the camera when it is moved about, e.g., by a camera operator walking while capturing video.

BRIEF SUMMARY

One embodiment provides a counterbalancing arrangement, comprising: a pin arrangement attached to a monopole; the pin arrangement rotating with respect to the monopole such that roll movement of the monopole imparts yaw movement to the pin arrangement; the pin arrangement having a gimbal; a camera mounting platform having an upper and lower surface; the gimbal connecting to the lower surface of the camera mounting platform; the gimbal having a yaw degree of freedom locked with respect to the camera mounting platform; and a counterbalancing arm attached to the camera mounting platform.

The counterbalancing arrangement of may include a pin arrangement that includes an intermediate element having at one end a connection to the monopole including an aperture for accepting a pin and having the gimbal at an opposite end. The counterbalancing arrangement may include a monopole that has a connecting element at an end thereof, the connecting element connecting to the intermediate element. The counterbalancing arrangement may include a connecting element that is angled with respect to a main axis of the monopole. The angle may be modifiable, e.g., via using a manual screw arrangement.

The counterbalancing arrangement may include a connecting element with a pin disposed within the aperture of the intermediate element. The counterbalancing arrangement may further comprise a dampening mechanism. The dampening mechanism may comprise a brush arrangement disposed proximate to the camera platform.

The counterbalancing arrangement may further comprise an integrated microphone attachment for attaching a microphone thereto. The microphone may be a wireless microphone or an integrated, wired microphone.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
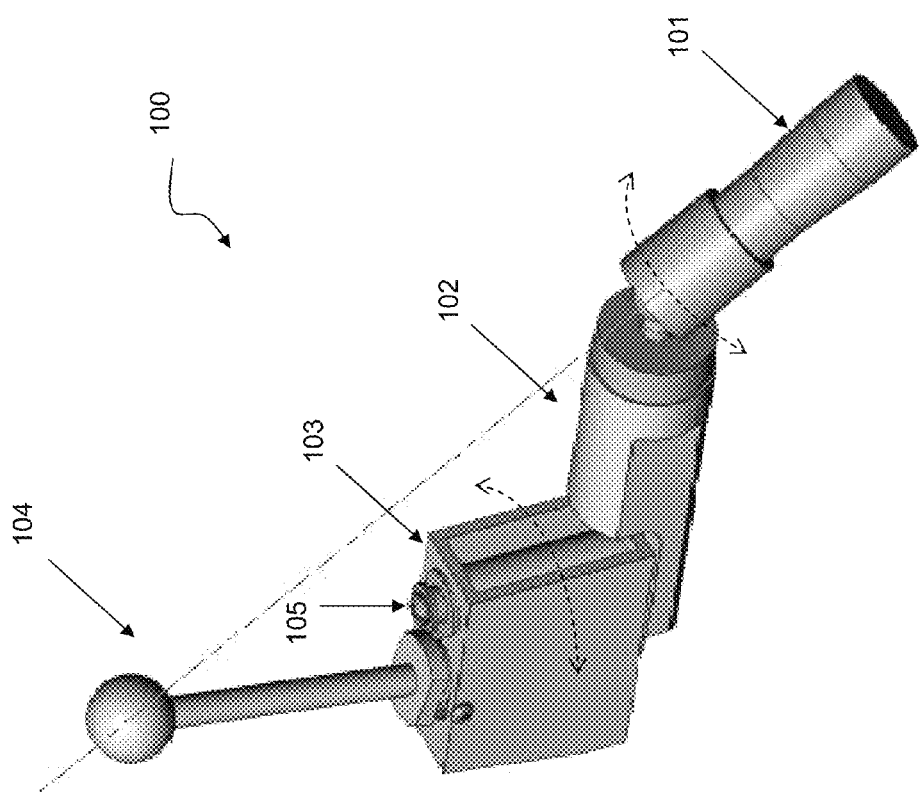
FIG. 1 illustrates a perspective view of an example counterbalanced monopod jib for small form cameras.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

Embodiments provide counterbalancing arrangements that facilitate balancing and thus stabilization of mounted cameras. Certain embodiments take the form of a monopod jib arrangement that facilitates counterbalancing of small form cameras mounted thereon. The characteristics and features of example embodiments will be more apparent from the description of the example embodiments, as provided herein.

Embodiments provide a gimbal at the end of a boom that provides inertial stabilization to a camera mounted thereon. The state of the art counterbalancing arrangements for stabilized cameras, such as STEADICAM, utilize a three-axis gimbal with the center of gravity of the suspended load directly under the center of the gimbal. The center of the gimbal is defined as the location where the three axes intersect.

Having the center of gravity being vertically offset from the gimbal causes the load to act like a pendulum or a mechanical low pass filter. This in turn rejects higher frequency disturbances, e.g., as induced by camera operator motion, which are objectionable to human visual acuity.

The pendulum, referencing gravitational force, by definition settles the payload into a vertical orientation. The restoring moment is caused by the momentary offset of the center of gravity with respect to the gimbal center as the camera deviates from vertical. This keeps tilt and roll referenced to the horizon. However for pan there is no restoring force. Panning the camera about the third gimbal axis causes no change in potential energy. For a handheld counterbalancing arrangement, e.g., a STEADICAM arrangement, this is not a deficiency. However, this is a problem for a camera mounted on the end of a boom or monopole. This is because the hand of the operator is remote from the gimbal and forces that control pan cannot be provided. Instead, with such an arrangement, the camera drifts in pan.

One solution is to simply lock out or eliminate the third (vertical) axis so that the pan angle of the camera remains fixed with respect to the boom. However this has a drawback in that one of the three rotational degrees of freedom is now directly attached to the operator, and no low pass filter is provided. A second drawback is that the loss of pan control limits the nature of the shots that can be had.

An embodiment therefore provides an offset connection for the boom with respect to the gimbal, thus coupling roll and yaw. The offset connection provides a linkage using a two-axis gimbal. An embodiment provides an offset pin that is inclined with respect to vertical. Rotating the boom rotates the vertical plane that contains the pin. One degree of freedom of the gimbal is locked out—the yaw degree of freedom. The gimbal therefore becomes a two axis u-joint. The boom is aligned with the gimbal, and this arrangement acts to provide a restoring moment to all three axes and gives the operator control over the settling position for pan.

The description now turns to the figures. The example embodiments will be best understood with reference to the figures, which illustrated certain representative example embodiments.

Referring to FIG. 1, an example embodiment provides a counterbalancing monopod jib arrangement 100 ("counterbalancing arrangement"). The counterbalancing arrangement 100 includes boom 101 which may be grasped and held by a user (e.g., camera operator). The end of the boom 101 is illustrated in the figures. The boom 101 provides an elongated means for moving the counterbalancing arrangement 100, for example when movement of the camera operator is desired. For example, a user may hold onto the boom 101 with one or both hands while walking about with the arrangement 100 to capture images (e.g., picture or video data) with a camera (not shown). The length of the boom 101 may be modified as desired but in the examples illustrated in the figures only the distal end of the boom 101 is illustrated for convenience. In an example embodiment, the boom 101 may include one or more hand grips to facilitate a user grasping and manipulating the boom 101. The one or more hand grips may be placed proximate to the end of the boom 101 distal to an end of the boom 101 having a connection with the connection element 102 and other components of the counterbalancing arrangement 100.

The boom 101 terminates at one end with a connection element 102. The connection element 102 may provide for adjustable connection between boom 101 and a gimbal joint 104. The connection element 102 may be provided such that it is at an angle with respect to the boom 101. The angle may be adjustable, e.g., via provisioning a manual screw for tightening and loosening a fastening arrangement for the angle of the connection element 102. In between the connection element 102 and gimbal 104 an intermediate element 103 may be provided. The intermediate element 103 provides an offset connection between the end of the boom 101, i.e., at connection element 102, and gimbal 104.

Still referring to FIG. 1, the gimbal 104 provides relatively frictionless movement for a camera mounting platform (not shown in FIG. 1) over a wide range of angles. The camera mounting platform provides an attachment portion for a camera on the surface opposite to the side accommodating a receiving component for the gimbal 104. The attachment portion for a camera allows for a camera to be reversibly attached to the camera mounting platform.

Intermediate element 103 pivots about connection element 102 by virtue of pin arrangement 105, i.e., a rotation arrangement about an axis, as indicated. The pin arrangement 105 permits intermediate element and attached gimbal 104 to move with respect to connection element 102, which is in turn secured to boom 101. Thus, an operator may rotate, in a controlled fashion, intermediate element about connection element 102 by turning boom 101, as indicated by dashed arrows in FIG. 1.

Figure 2:
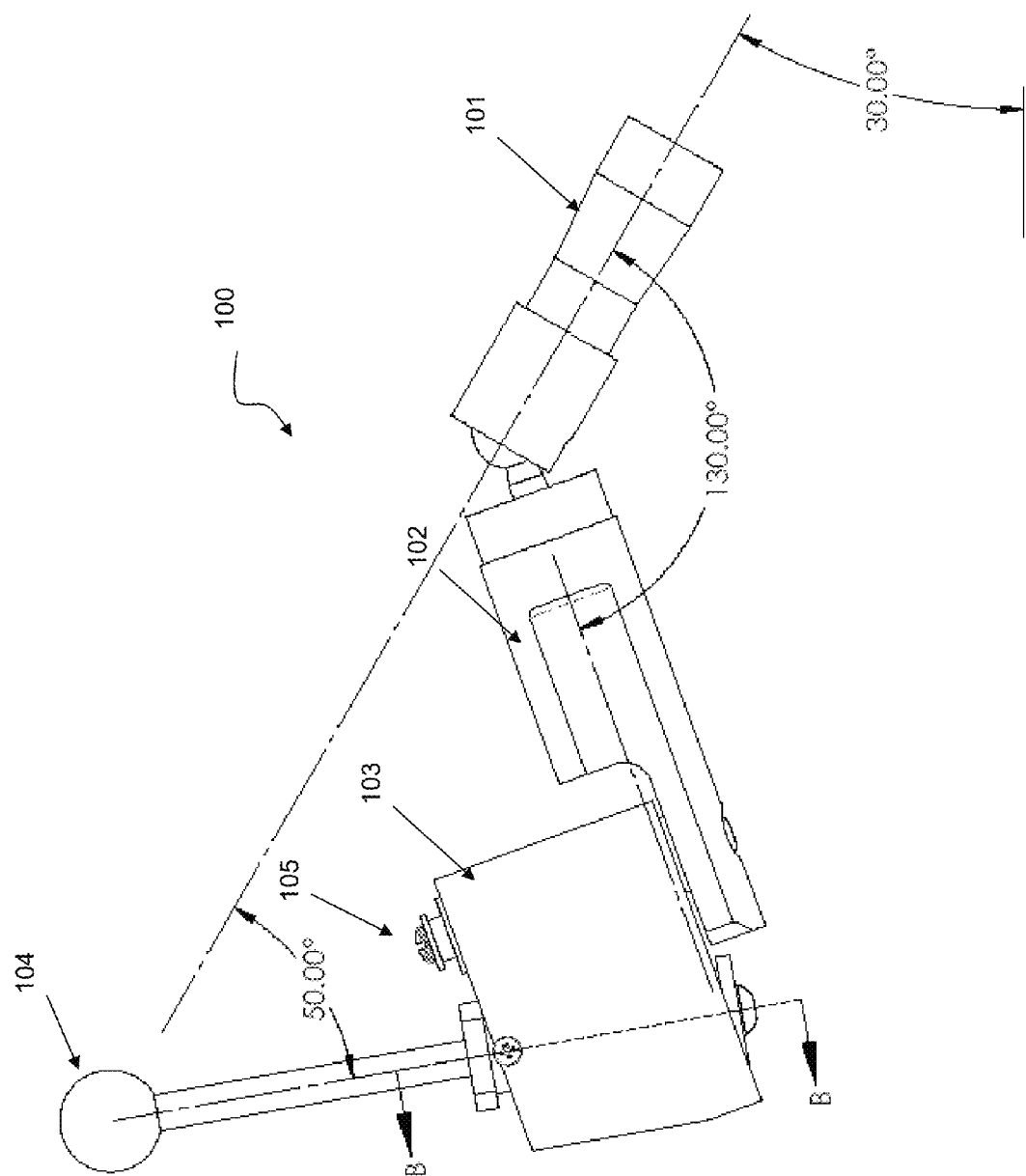
FIG. 2 illustrates a side view of an example counterbalanced monopod jib for small form cameras.

Referring to FIG. 2, an example side view of the counterbalancing arrangement 100 is provided. Boom 101, connection element 102, intermediate element 103, and gimbal 104 are aligned with the centerline of the boom 101 (see also FIG. 3). The connection element 102, the intermediate element 103 and the gimbal 104 are illustrated with particular, example angular orientations with respect to one another in FIG. 2; however, these may be modified and are only provided by way of example.

Connection element 102 provides an arrangement for repositioning intermediate element 103 with respect to boom 101. For example, boom 101 may be rotated and this rotation imparted to gimbal 104 (and thus a camera mounted thereon) by virtue of connection element 102 and intermediate element 103 moving about one another via pin arrangement 105, as illustrated using the dashed arrows in FIG. 1. The movement between intermediate element 103 and connecting element is illustrated in FIG. 3 using dashed arrow.

Figure 3:
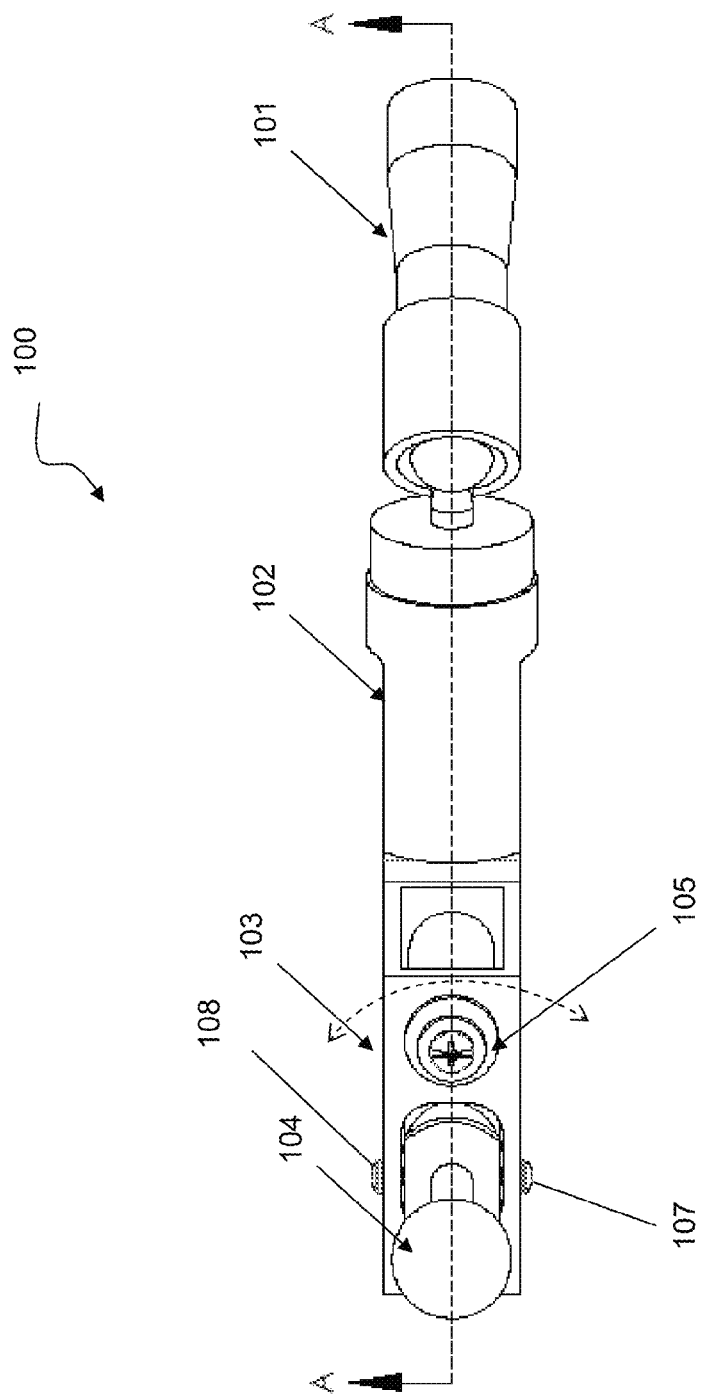
FIG. 3 illustrates a top view of an example counterbalanced monopod jib for small form cameras.

FIG. 3 provides a top view of the example counterbalancing arrangement 100. The intermediate element 103 may rotate about connecting element 102 using pin arrangement 105, as indicated by dashed arrow in FIG. 3. The movement of the camera operator, translated via the boom 101, is effectively dampened or eliminated by the counterbalancing arrangement 100, including gimbal 104 connection to a camera mounting platform and counterbalancing arm (not shown). Moreover, the pin arrangement 105 permits boom 101 to transmit rotating motion to intermediate element 103 and thus permits a greater range of panning motion control for a camera mounted atop gimbal 104.

Figure 4:
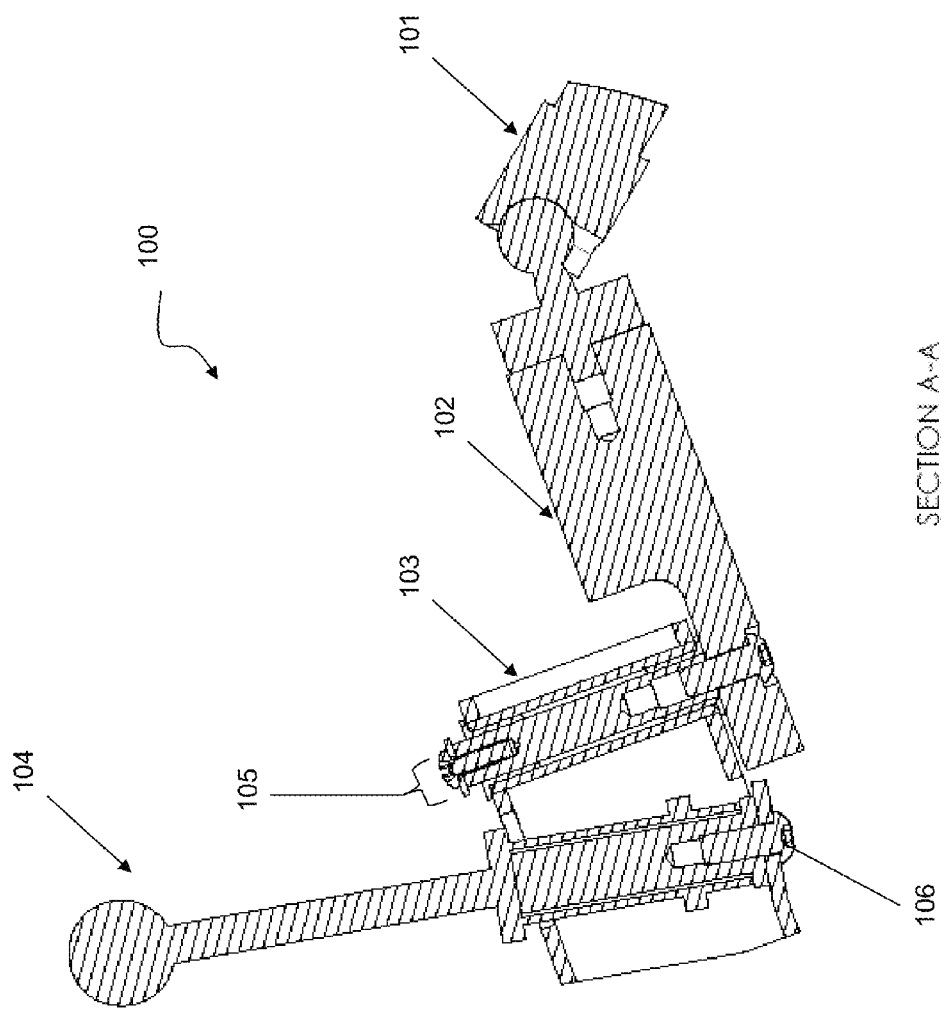
FIG. 4 illustrates a cross sectional view along section A-A of FIG. 3.

FIG. 4 illustrates a cross-sectional side view of the counterbalancing arrangement 100 along section A-A of FIG. 3. Boom 101 may connect to connection element 102 via a ball and socket arrangement, as illustrated in FIG. 4. The connection element may include a hole therein for insertion of pin element 105 such that intermediate element 103 may be attached. Intermediate element 103, for its part, provides rotation about a pivot point defined by attachment of pin element 105 to connection element 102. The intermediate element 103 also provides a fitting therein for securing the gimbal 104, e.g., via attachment screw 106. The gimbal 104 may be fixed with respect to intermediate element 103. Thus, movement of the intermediate element 103 is transferred to the gimbal 104.

Figure 5:
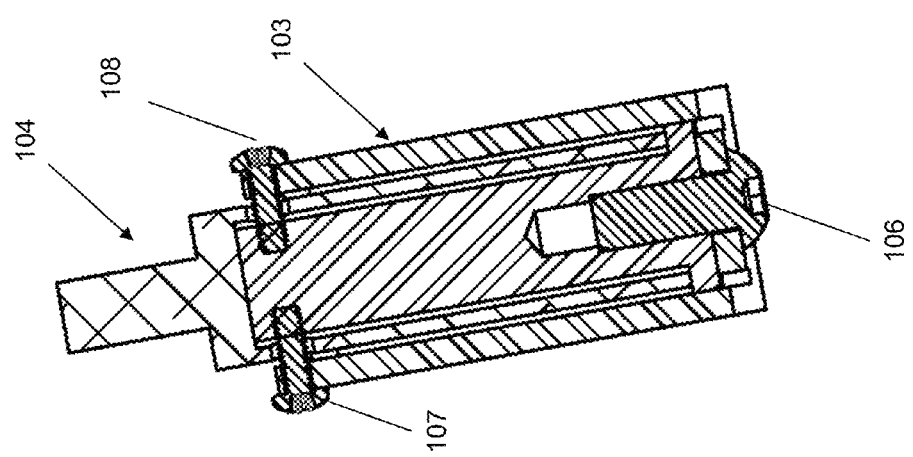
FIG. 5 illustrates a cross sectional view along section B-B of FIG. 2.

FIG. 5 illustrates a cross sectional view along section B-B of FIG. 2. Illustrated at an upper end is a lower portion of gimbal 104 which, as with FIG. 4, may be attached to intermediate element 103 via a suitable arrangement, e.g., an attachment screw 106. Gimbal 104 may be secured to the intermediate element 103 further, e.g., to prevent rotation there-between, via a suitable securing mechanism, e.g., screws 107, 108.

The counterbalancing arrangement 100 therefore provides a connection between a boom 101 and a camera mounting platform attached to the gimbal 104. The counterbalancing arrangement 100 permits rotation of the intermediate element 103 about connection element 102 in response to movement/rotation of the boom 101. This motion is transferred to the gimbal and thus permits the camera to be panned without sacrificing the stabilizing nature of the counterbalancing arrangement 100.

Figure 6:
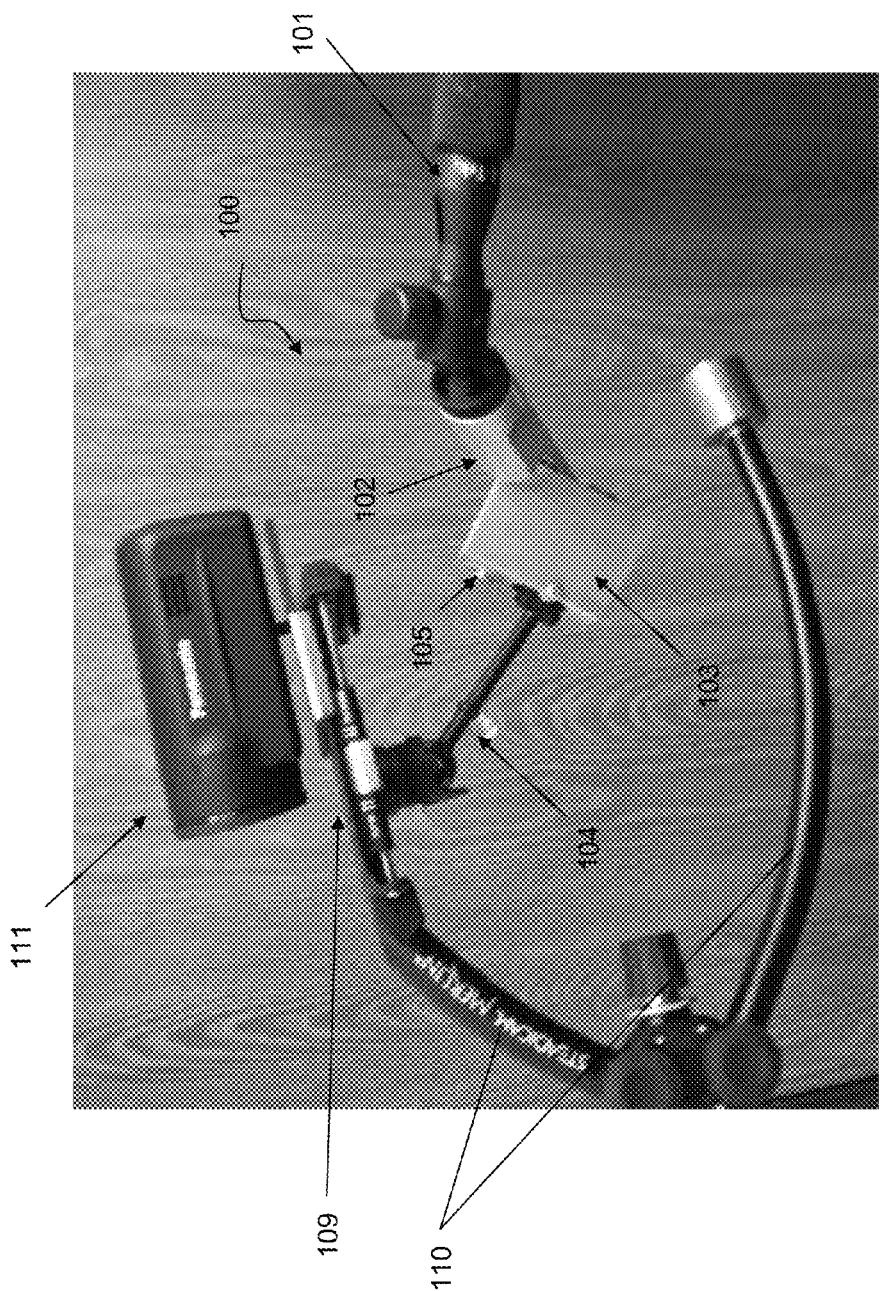
FIG. 6 illustrates an example counterbalanced monopod jib for small form cameras in a first orientation.
Figure 7:
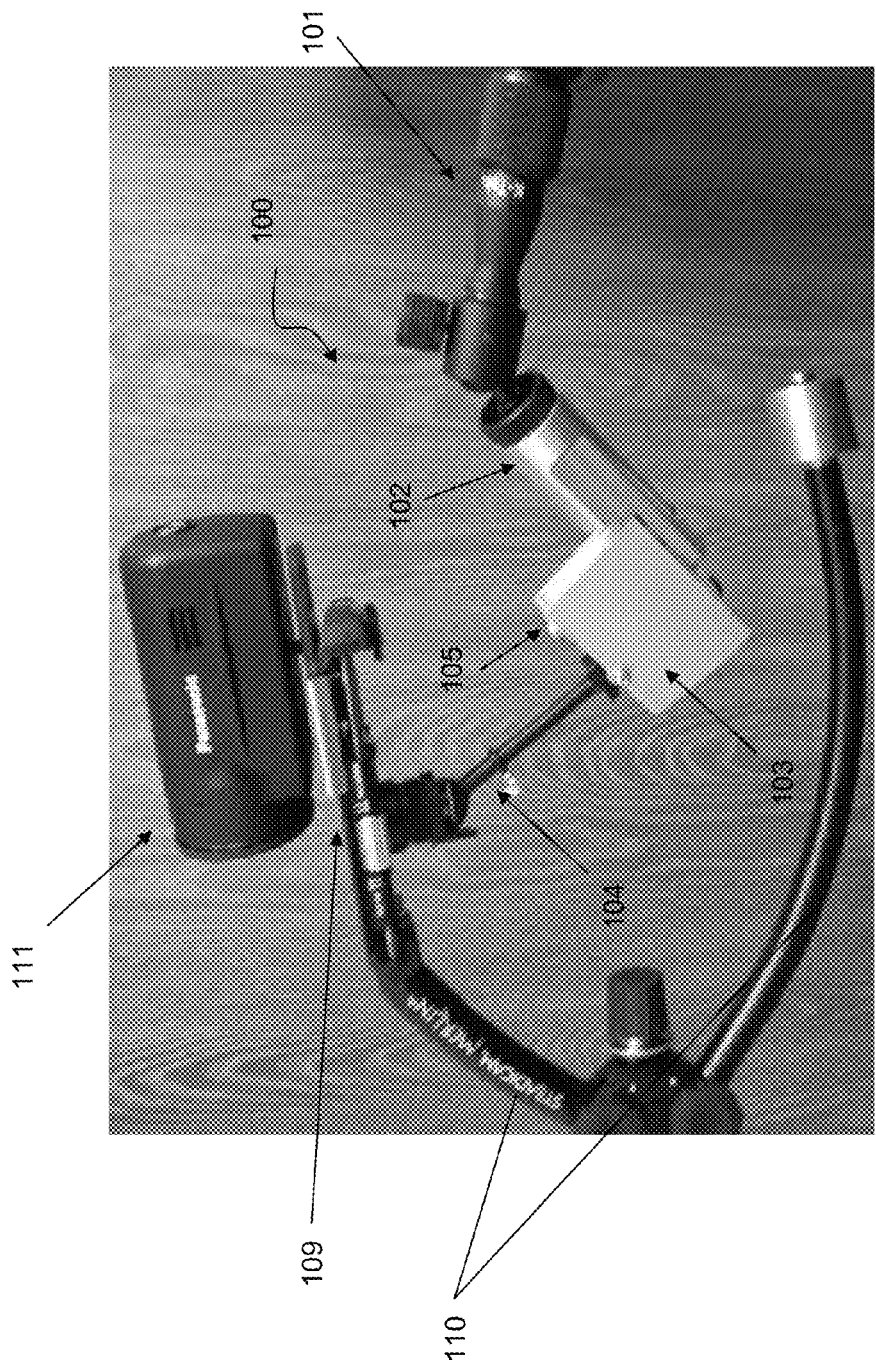
FIG. 7 illustrates an example counterbalanced monopod jib for small form cameras in a second orientation.
Figure 8:
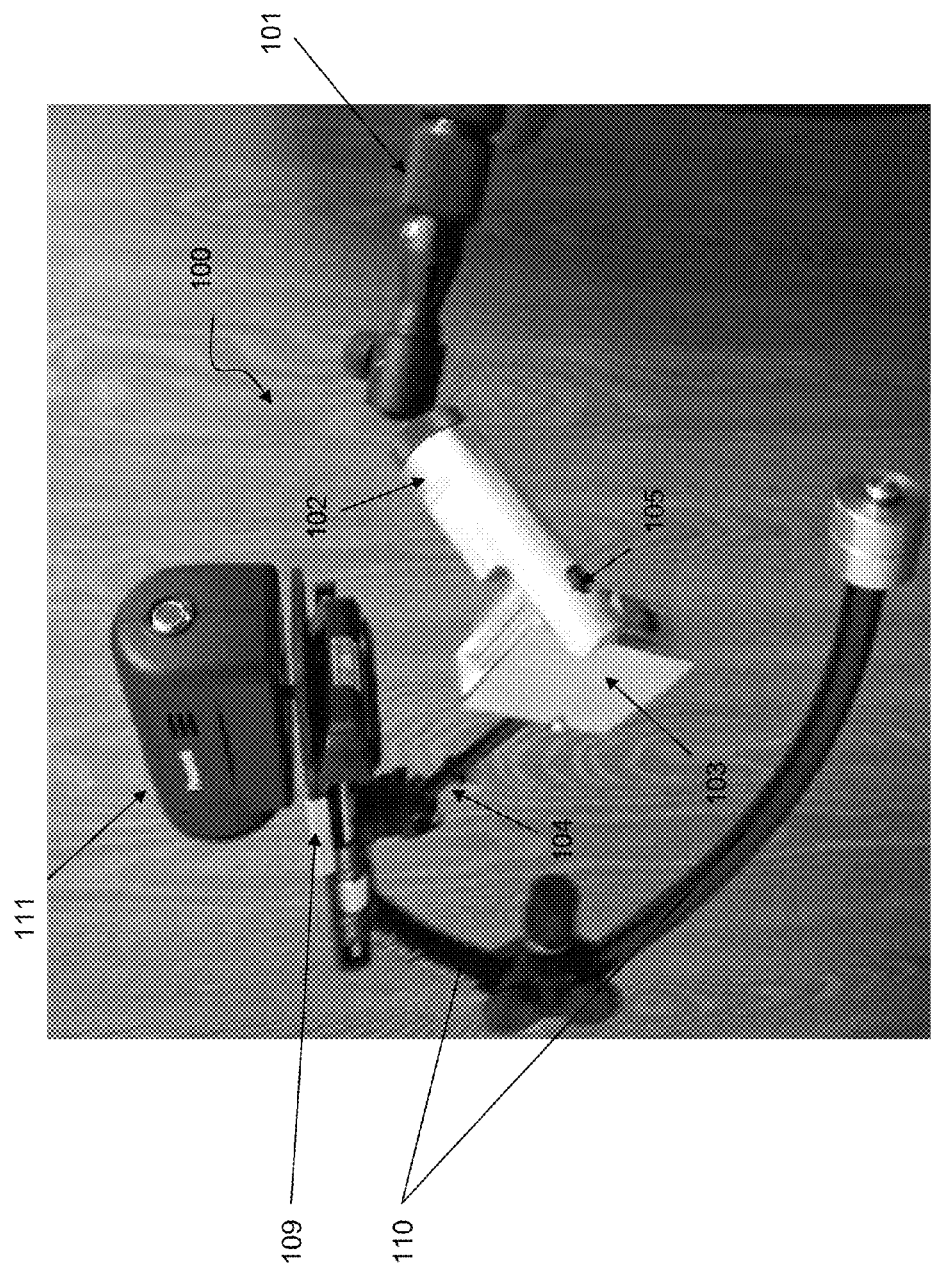
FIG. 8 illustrates an example counterbalanced monopod jib for small form cameras in a third orientation.

The panning provided by the counterbalancing arrangement 100 is illustrated in FIG. 6-8. The counterbalancing arrangement 100 provides an offset connection using elements 102, 103, and 105 for the boom 101 with respect to the gimbal 104, thus coupling roll and yaw. The offset connection provides a linkage using a two-axis gimbal. An embodiment provides an offset pin 105 that is inclined with respect to vertical, as illustrated in FIG. 6. Rotating the boom 101, as illustrated by the changing boom 101 orientations of FIGS. 6, 7 and 8, rotates the vertical plane that contains the pin 105. One degree of freedom of the gimbal 104 is locked out—the yaw degree of freedom. The gimbal 104 becomes a two axis u-joint. The boom 101 is aligned with the gimbal 104, and this arrangement acts to provide a restoring moment to all three axes and gives the operator control over the settling position for pan of the camera 111 which sits atop a mounting platform 109 and is balanced by counterbalancing arm 110.

Figure 9:
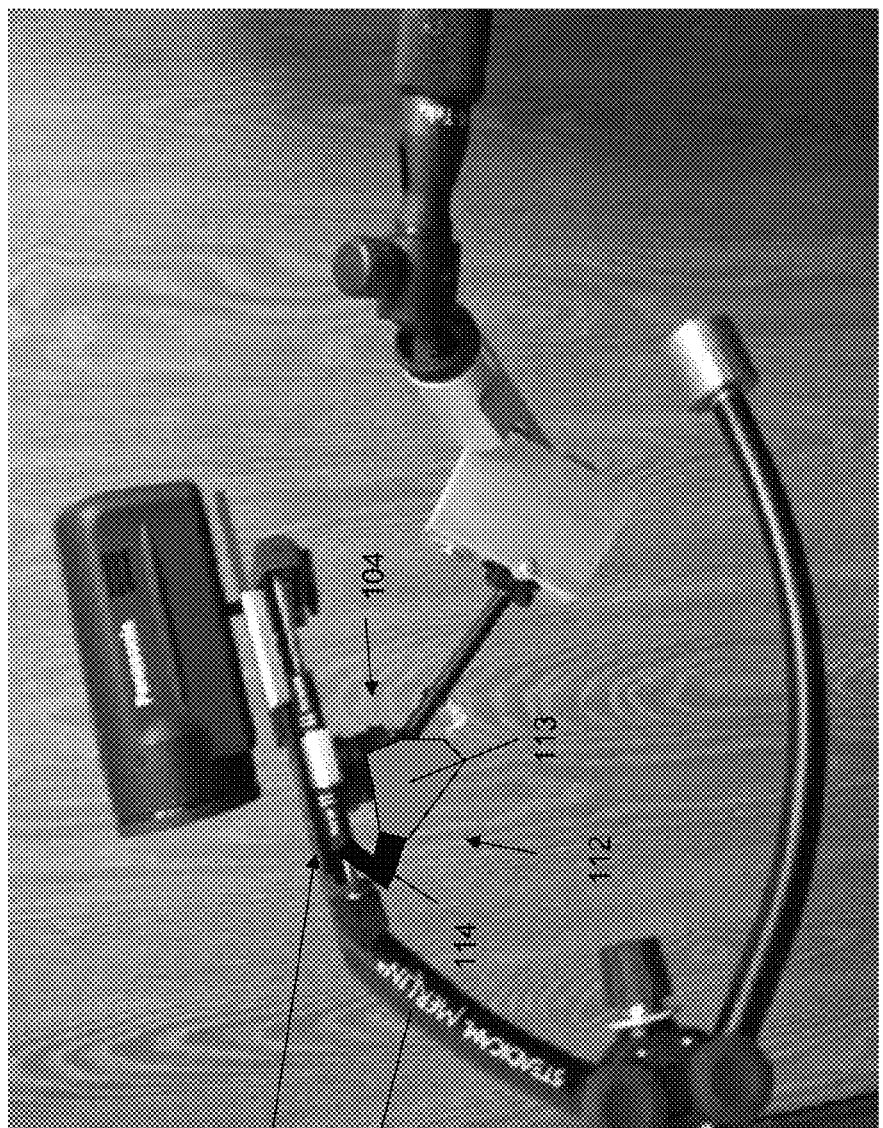
FIG. 9 illustrates an example counterbalanced monopod jib for small form cameras having a dampening arrangement.

The counterbalancing arrangement may further include a dampening arrangement, as illustrated in the example of FIG. 9. The dampening arrangement 112 may be suitably chosen and positioned to provide dampening of a variety of forces, e.g., pitch of the camera as mounted on a mounting platform 109. For example, a brush arrangement or other like physical dampening arrangement 112 may be provided at the underside of the mounting platform 109 such that it imparts a resistive force of increasing strength proportionate to the degree of motion, e.g., pitch forward, as it contacts another component of the counterbalancing arrangement 100.

In the example of FIG. 9, a brush arrangement may be used as a dampening arrangement to control pitch. The brush arrangement may include a connection portion 114 connecting to another component, e.g., mounting platform 109. The dampening arrangement 112 includes a soft material, e.g., bristles 113 of the brush arrangement, such that increasing resistance may be imparted to a component, e.g., a portion of gimbal 104, when a certain movement is applied, e.g., pitch.

Again, the dampening arrangement 112 may be disposed to the underside of the mounting platform 109 such that it gently contacts the gimbal 104 portion to dampen motion. Additionally or alternatively, a dampening arrangement may be provided to the counterbalancing arrangement at other portion(s), e.g., at counterbalancing arm 110, such that the arm may not swing as freely with respect to the gimbal 104. Therefore, one or more dampening arrangements 114 may be provided to advantageously reduce the freedom of motion of the arrangement. The nature, disposition and/or number of dampening arrangements may be modified to suit a particular context. Moreover, the dampening arrangement(s) may be removable to easily accommodate a variety of operating conditions.

Additional components may be included with the counterbalancing arrangement 100 to suit particular contexts. For example one or more microphone mounts may be provided with the counterbalancing arrangement 100, e.g. at connection element 102. The microphone mounts or attachments may provide for attachment of wired or wireless microphones used in connection with camera 111.

An embodiment may further include one or more tilt control mechanisms. As an example, a first tilt control may include one or more weights provided to the counterbalancing arrangement 100 to prevent or counteract unwanted tilting motion imparted to the camera 111 via an operator. For example, a detent may be used to restrict tilting motion of the camera mount 109. This detent may be used along with one or more weights, e.g., a weight may be attached to the armature and/or a slidable weight (along the horizontal plane) may be provided, with the weight(s) being used to bias or balance the jib in order to prevent unwanted tilting movements. In another example, additionally or alternatively, a yoke may be employed whereby the camera mount 109 may be permitted to pitch about its center of gravity by way of the yoke, but be restricted in tilt directions, thereby restricting unwanted tilt movements.

With reference to the angles selected for inclusion in the examples illustrated, it should be noted that one or more of the angles may be made adjustable, as described herein. For example, having the angle between the boom 101 and the connecting arrangement 102 adjustable, e.g., via screw or like mechanism, provides an advantage to an operator taking high or low shots, with resultant angles being preferable for obtaining such viewpoints while operating the counterbalancing arrangement 100.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A counterbalancing arrangement, comprising:
   a pin attached to a boom;
   an intermediate element rotatably attached to the pin;
   a gimbal fixed to the intermediate element and attached to a lower surface of a camera mounting platform;
   the pin being fixed to and rotating with respect to the boom such that roll movement of the boom imparts panning movement to the gimbal;

the gimbal being fixed with respect to panning movement of the camera mounting platform such that panning movement of the gimbal provided by rotation of the intermediate element about the pin as the boom is rolled imparts panning movement to the camera mounting platform; and a counterbalancing arm attached to the camera mounting platform, wherein a dampening mechanism is disposed proximate to the camera mounting platform.

2. The counterbalancing arrangement of claim 1, wherein the intermediate element has at one end a connection to the boom including an aperture for accepting the pin and having the gimbal at an opposite end.

3. The counterbalancing arrangement of claim 2, wherein the boom includes a connecting element at an end thereof, the connecting element connecting to the intermediate element.

4. The counterbalancing arrangement of claim 3, wherein the connecting element is angled with respect to an axis of the boom.

5. The counterbalancing arrangement of claim 4, wherein the angle is modifiable.

6. The counterbalancing arrangement of claim 5, wherein the angle is modifiable using a manual screw.

7. The counterbalancing arrangement of claim 3, wherein the connecting element includes the pin disposed within the aperture of the intermediate element.

8. The counterbalancing arrangement of claim 1, wherein the dampening mechanism comprises a brush arrangement.

9. The counterbalancing arrangement of claim 1, further comprising an integrated microphone attachment.

10. The counterbalancing arrangement of claim 9, further comprising a microphone attached to the integrated microphone attachment.

11. The counterbalancing arrangement of claim 10, wherein the microphone is a wireless microphone.

* * * * *